(12) United States Patent
Cahill et al.

(10) Patent No.: US 9,096,204 B2
(45) Date of Patent: Aug. 4, 2015

(54) SYSTEM AND METHOD FOR DETERMINING AN ADAPTIVE TURNAROUND THRESHOLD

(71) Applicant: Goodrich Corporation, Charlotte, NC (US)

(72) Inventors: Eric Daniel Cahill, Troy, OH (US); John Swank, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 174 days.

(21) Appl. No.: 13/712,386

(22) Filed: Dec. 12, 2012

(65) Prior Publication Data

US 2014/0163815 A1    Jun. 12, 2014

(51) Int. Cl.
*F16D 66/00* (2006.01)
*B60T 17/22* (2006.01)
*F16D 66/02* (2006.01)
*B60T 8/17* (2006.01)

(52) U.S. Cl.
CPC .............. *B60T 17/22* (2013.01); *F16D 66/00* (2013.01); *B60T 8/1703* (2013.01); *B60T 2270/406* (2013.01); *F16D 66/023* (2013.01); *F16D 2066/001* (2013.01); *F16D 2066/006* (2013.01)

(58) Field of Classification Search
CPC ............ F16D 66/023; F16D 2066/001; F16D 2066/006; B60T 2270/406
See application file for complete search history.

(56) References Cited

U.S. PATENT DOCUMENTS

| 4,569,600 | A | 2/1986 | Preniczny et al. |
| 8,151,944 | B2 * | 4/2012 | Waltz ...................... 188/1.11 E |
| 8,152,246 | B2 * | 4/2012 | Miller et al. .................. 303/191 |

FOREIGN PATENT DOCUMENTS

WO    2006072802 A1    7/2006

OTHER PUBLICATIONS

Extended European Search Report dated May 19, 2014, for European Patent Application No. 13193351.7.

* cited by examiner

*Primary Examiner* — John R Olszewski
*Assistant Examiner* — Todd Melton
(74) *Attorney, Agent, or Firm* — Kinney & Lange, P.A.

(57) ABSTRACT

A method includes measuring a brake temperature of an aircraft brake using a sensor; determining a brake heat sink mass of the aircraft brake using a wear measuring device; and calculating a turnaround threshold based upon the measured brake temperature and the determined brake heat sink mass.

19 Claims, 3 Drawing Sheets

SYSTEM AND METHOD FOR DETERMINING AN ADAPTIVE TURNAROUND THRESHOLD

BACKGROUND

The present invention is related to aircraft brakes, and in particular to a system and method for determining a turnaround threshold for aircraft.

Regulations require aircraft brakes to be able to handle an aborted takeoff at any moment prior to the plane leaving the runway. The brakes for an aircraft have a heat sink mass and a temperature. The lesser the heat sink mass, the greater the brake temperature generated during braking. When the brake is at the end of its life, the heat sink mass will be at a minimum. Thus, this generates the greatest brake temperatures during braking. If the brakes reach a great enough temperature, they can fail. Thus, the brakes must be below a threshold temperature that ensures the brakes will not overheat during an aborted takeoff.

In the past, the threshold temperature has been determined based upon a worst case scenario. It is assumed that each brake is at the end of its lifecycle with minimal heat sink mass. Based upon this assumption, the threshold temperature is calculated and the aircraft cannot pull away from the gate until the temperature of the brakes are below that threshold. This can create unnecessary delays in the turnaround time of the aircraft. It is desirable to adapt the turnaround time so that delays in leaving the gate can be optimized based upon actual requirements as opposed to worst case scenarios.

SUMMARY

A method includes measuring a brake temperature of an aircraft brake using a sensor, determining a brake heat sink mass of the aircraft brake using a wear measuring device, and calculating a turnaround threshold based upon the measured brake temperature and the determined brake heat sink mass.

DETAILED DESCRIPTION

The present invention describes a system and method for determining an adaptive turnaround threshold temperature for an aircraft. Aircraft brakes are often composed of several rotor disc and stator disc pairs, which together are often referred to as brake heat sinks. These brake heat sinks convert kinetic energy into thermal energy that results from slowing the rotation of the wheel. The heat sink mass reduces over time due to wear from friction generated during braking. Because of the high speed and weight of an aircraft, very high temperatures may be generated during braking, especially in an aborted takeoff close to $V_1$ speed (takeoff decision speed).

Heat sink mass of a brake may be determined using wear measuring devices. An electric brake actuator, for example, may be implemented as a wear measuring device. Brake actuators extend to apply a force to a stator disc of the heat sink. Thus, the actuator may be used to determine the present length of the brake heat sink. The mass of the heat sink can be determined based in part upon the determined length of the heat sink. This mass is provided to an adaptive turnaround calculator. This calculator may be implemented in the brake control unit, the avionics, or any other electronic system on the aircraft. Temperature sensors at the brake heat sink also provide a brake temperature to the adaptive turnaround calculator. The calculator uses the determined brake heat sink mass and brake temperature to calculate an adaptive turnaround threshold. This threshold indicates the maximum temperature the brakes can be prior to pulling out of the gate such that an aborted takeoff may occur at or around the $V_1$ speed without the brakes overheating and possibly failing. The calculator may also use other factors such as aircraft weight, air pressure, or any other data received from, for example, an aircraft communications bus. The adaptive takeoff threshold is provided to a pilot of the aircraft so that the aircraft may leave the gate as soon as possible, reducing delays caused by waiting for the brakes to drop below a worst case temperature.

Figure 1:
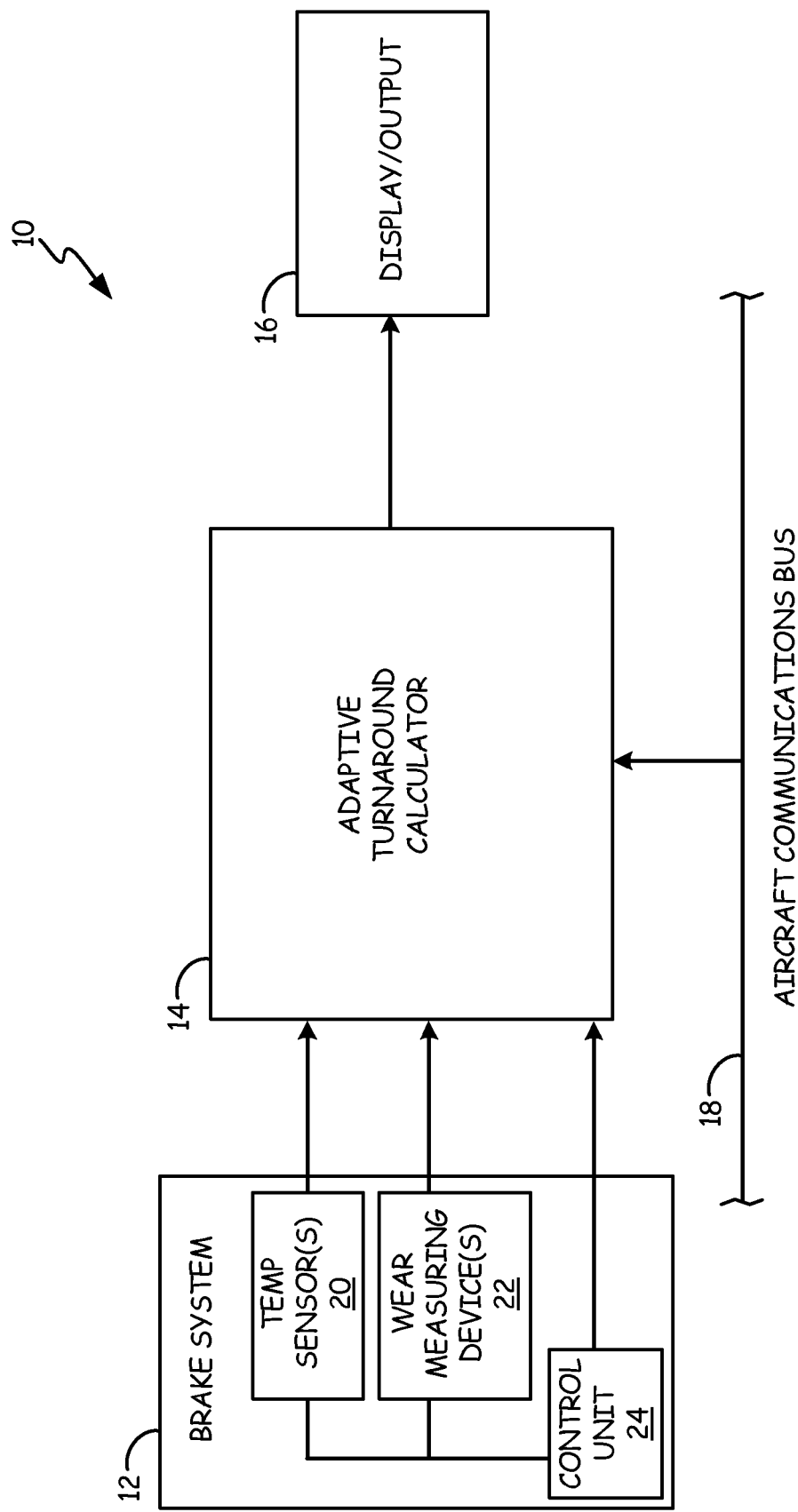
FIG. 1 is a block diagram illustrating a system for determining an adaptive turnaround threshold.

FIG. 1 is a block diagram illustrating system 10 for determining an adaptive turnaround threshold. System 10 includes brake system 12, adaptive turnaround calculator 14, display/output module 16, and aircraft communication bus 18. Brake system 12 includes temperature sensors 20, wear measuring devices 22, and brake control unit 24. Display/output module 16 is any display capable of communicating or annunciating an adaptive turnaround threshold to a pilot of an aircraft that includes system 10. Aircraft communication bus 18 is any known aircraft communication bus. Brake system 12 is, for example, an electromechanical, pneumatic, hydraulic, fuel-hydraulic or any other known brake system. Temperature sensors 20 are any sensors capable of measuring a temperature at or around a brake heat sink of brake system 12.

Wear measuring devices 22 are any devices capable of determining the mass of a heat sink of a brake of brake system 12. Wear measuring devices 22, for example, are capable of measuring the length of a brake heat sink of brake system 12. With all other brake geometry known and constant, the volume of the brake heat sink can be calculated. Given the calculated volume of the heat sink, along with the known material and material density of the heat sink, the mass of the heat sink can be calculated. These calculations may be accomplished in brake control unit 24, turnaround calculator 14, by wear measuring device 22 itself, or by any other electronic system onboard the aircraft.

In one embodiment, electric brake actuators, for example, may be used to determine the mass of a heat sink of an electromechanical brake system. An actuator extends to apply pressure to a stator disc of the heat sink. This creates friction in order to slow the rotation of the wheel. This friction creates wear which causes the length of the heat sink to reduce over time. The lesser the length of the heat sink, the further the actuator must extend in order to apply pressure to the heat sink. The distance the actuator must extend can be obtained from the actuator using known methods. Using the distance the actuator must extend, the present length of the heat sink can be determined. This length, along with known values for the heat sink such as, for example, the surface area, mass per unit volume, material, and material density can be used to determine the current mass of the heat sink. The mass may also be determined using any other known methods of determining the length of the heat sink, a brake wear sensor independent of the brake system, or any other device capable of determining the mass of the brake heat sink.

Adaptive turnaround calculator 14 is used to determine an adaptive turnaround threshold temperature. This threshold indicates a maximum temperature for which the aircraft could abort a takeoff at or near the $V_1$ speed without overheating the brakes. Thus, the adaptive threshold must be based upon the thermal capacity of the most worn brake of the aircraft. The threshold is calculated using data from temperature sensors 20, wear measuring devices 22, and aircraft communications bus 18. Temperature sensors 20 provide the current temperature of each brake, wear measuring devices 22 provide data to determine the current mass of each brake, and aircraft communications bus 18 provides other data such as, for example, ambient temperature, air pressure, aircraft weight, and any other data measured by sensors in an aircraft.

In one embodiment, adaptive turnaround calculator 14 may be implemented using a lookup table with a determined granularity such as, for example, twenty-five degrees. The brake temperature from temperature sensors 20 and the brake heat sink mass from wear measuring devices 22 are input into adaptive turnaround calculator 14. The measured brake temperature and brake heat sink mass, as well as any other inputs from communication bus 18 are used to index into the lookup table. This may be implemented as an analog circuit, digital logic circuit, or any other type of electronic circuit such as, for example, a field programmable gate array (FPGA), a read-only memory (ROM), a microcontroller or an application-specific integrated circuit (ASIC) implemented within any of the aircraft electronic systems such as, for example, the brake control unit or the avionics.

In another embodiment, adaptive turnaround calculator 14 may be implemented to, for example, execute an equation. The brake temperature from temperature sensors 20 and the brake heat sink mass determined from wear measuring devices 22 are input into adaptive turnaround calculator 14 which determines an output as a function of the two inputs. This may be implemented as an analog circuit, digital logic circuit, or any other type of electronic circuit such as, for example, a field programmable gate array (FPGA), a read-only memory (ROM), a microcontroller or an application-specific integrated circuit (ASIC) implemented within any of the aircraft electronic systems such as, for example, the brake control unit or the avionics.

An estimated turn-around time may also be calculated based upon the adaptive turnaround threshold and the measured brake temperature. This time is representative of the estimated amount of time before the aircraft can leave the gate. Temperature sensors 20 provide the present temperature of the brakes and the calculated adaptive turnaround threshold provides the maximum temperature the brakes may be before turning around out of the gate. Thus, based upon the known amount of time it takes for the brakes to cool from a first temperature to a second temperature, the estimated time it will take for all brakes to reach the turnaround threshold temperature may be determined. This estimated time may be calculated using adaptive turnaround calculator 14, or any other electronic system onboard the aircraft.

Display/output 16 may be located, for example, within the cockpit of an aircraft containing system 10. In one embodiment, display/output 16 may be a go/no-go indicator, such as, for example, one or more light-emitting diodes. The light may be red, for example, when the brakes are too hot, and may be green, for example, when the brakes have cooled beyond the adaptive turn-around threshold. In another embodiment, multiple indicators may be implemented, for example, having one for each brake. The pilot may then monitor the indicators for each brake and determine when the aircraft may leave the gate. In another embodiment, display/output 16 may be any type of display screen capable of displaying any information related to the adaptive turnaround threshold such as, for example, the adaptive turnaround threshold temperature, the estimated turn-around time, the present brake temperatures, a difference between the adaptive turnaround threshold temperature and the present brake temperatures, or any combination thereof.

Figure 2:
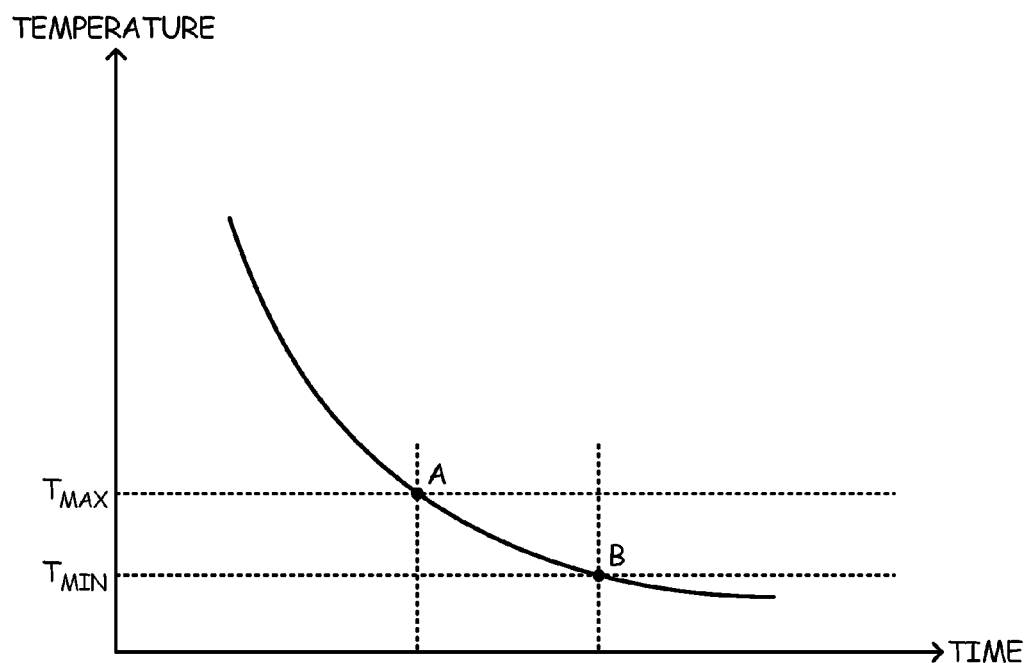
FIG. 2 is a chart illustrating an adaptable turnaround threshold.

FIG. 2 is a chart illustrating brake temperature vs. time according to an embodiment of the present invention. $T_{MAX}$ is the temperature corresponding to a turnaround threshold for brakes with maximum heat sink mass. $T_{MIN}$ is the temperature corresponding to a turnaround threshold for brakes with minimum heat sink mass. $T_{MIN}$ represents the current state of the art static departure temperature. Point A illustrates the time in which the brake temperature reaches $T_{MAX}$ and point B illustrates the time in which the brake temperature reaches $T_{MIN}$. In the past, the pilot would always need to wait until the time at point B to pull out of the gate. With the present invention, the pilot may now pull out of the gate as early as point A, depending on the determined brake heat sink mass.

Figure 3:
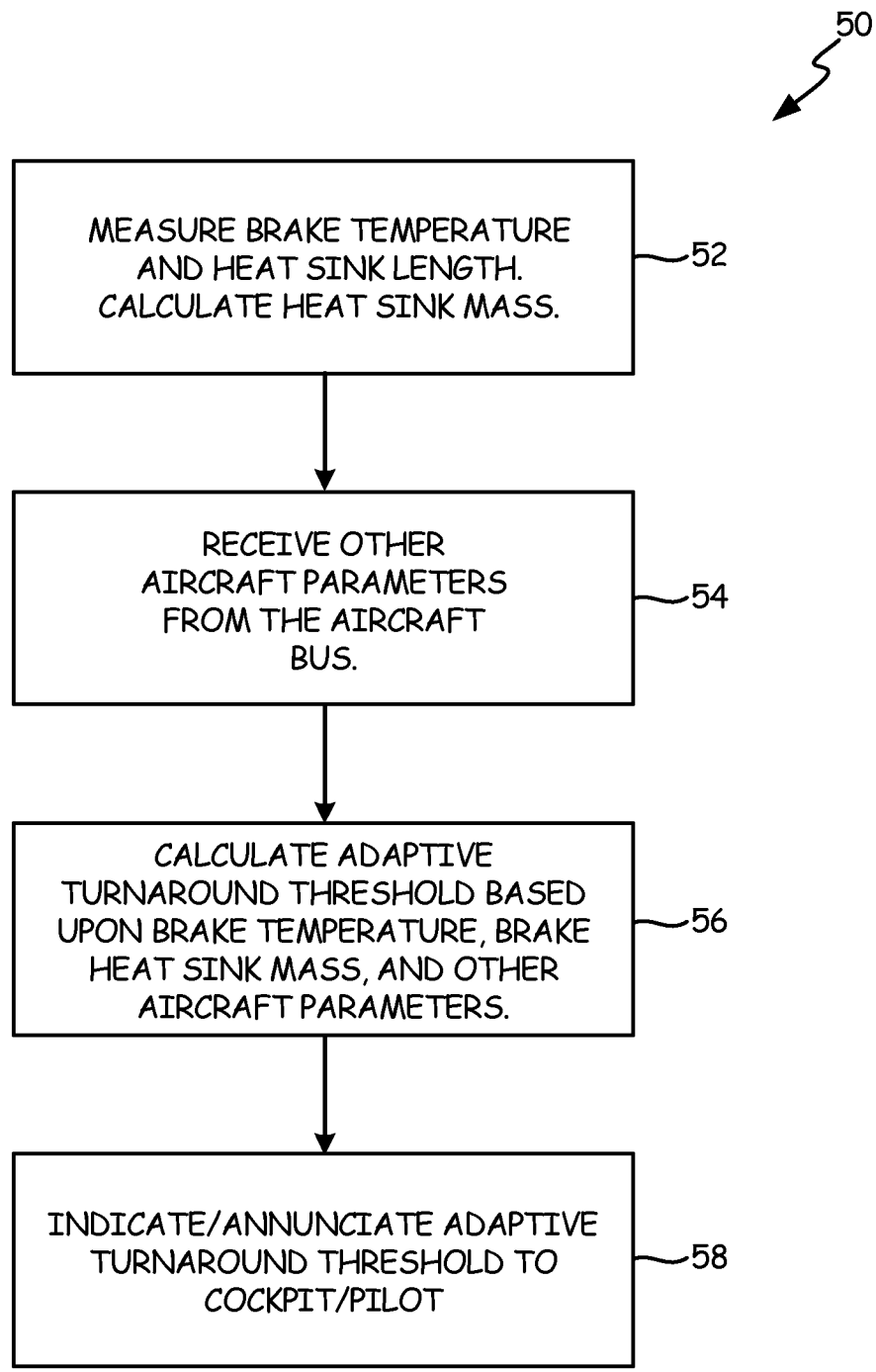
FIG. 3 is a flowchart illustrating a method of determining an adaptable turnaround threshold.

FIG. 3 is a flowchart illustrating a method 50 for determining an adaptive turnaround threshold according to an embodiment of the present invention. Starting at step 52, the brake temperature and brake heat sink length are determined using temperature sensors 20 and wear measuring devices 22, respectively. The brake heat sink mass is calculated using the measured brake heat sink length. At step 54, other aircraft parameters such as ambient temperatures, air pressure, aircraft weight, and others are obtained from aircraft communication bus 18. At step 56, adaptive turnaround calculator 14 calculates an adaptive turnaround temperature threshold based upon the brake temperature, brake heat sink mass, and parameters received from aircraft communication bus 18. An estimated turnaround time may also be calculated at step 56 using, for example, adaptive turnaround calculator 14. At step 58, the turnaround threshold is indicated to, for example, a pilot of the aircraft containing system 10 using display/output 16. The pilot may turn the aircraft around out of the gate upon the measured brake temperature reaching the adaptive turnaround threshold temperature.

The following are non-exclusive descriptions of possible embodiments of the present invention.

A method includes, among other things: measuring a brake temperature of an aircraft brake using a sensor, determining a brake heat sink mass of the aircraft brake using a wear measuring device, and calculating a turnaround threshold based upon the measured brake temperature and the determined brake heat sink mass.

The method of the preceding paragraph can optionally include, additionally and/or alternatively, any one or more of the following features, configurations and/or additional components.

Calculating an estimated turnaround time based upon the measured brake temperature and the calculated turnaround threshold.

Calculating a turnaround threshold includes inputting the determined brake heat sink mass and the measured brake temperature into a lookup table or equation, wherein the lookup table or equation provides an output of the calculated turnaround threshold.

The lookup table or equation is implemented using digital logic.

Indicating when the measured brake temperature is lower than the turnaround threshold using a display or annunciation.

Calculating a turnaround threshold is further based upon data received from an aircraft communications bus.

Determining a brake heat sink mass includes measuring a length of the brake heat sink using the wear measuring device, and calculating the brake heat sink mass based upon the measured length of the brake heat sink.

Measuring a length of the brake heat sink includes determining a distance an electric brake actuator extends before it contacts the brake heat sink of the aircraft brake, a and determining the length of the brake heat sink based upon the determined distance the electric brake actuator extends before it contacts the brake heat sink.

A system includes, among other things: a turnaround calculator that determines a turnaround threshold based upon a received brake temperature and a received brake heat sink mass, and a display that provides an output indicative of the determined turnaround threshold based upon an output of the turnaround calculator.

The method of the preceding paragraph can optionally include, additionally and/or alternatively, any one or more of the following features, configurations and/or additional components.

The received brake temperature is received from at least one brake temperature sensor.

The received brake heat sink mass is calculated based upon known brake heat sink geometry and a received brake heat sink length from at least one wear measuring device.

The received brake heat sink length is determined based upon a distance an electric brake actuator must extend before it contacts a heat sink of an aircraft brake.

The turnaround calculator comprises a lookup table that is indexed using the received brake temperature and the received brake heat sink mass.

The turnaround calculator comprises an electronically implemented equation.

The determined turnaround threshold is further based upon data received from an aircraft communications bus.

A turnaround calculator includes, among other things: an input that receives a measured aircraft brake temperature, an input that receives a determined aircraft brake heat sink mass, a module that calculates a turnaround threshold based upon the measured brake temperature and the determined brake heat sink mass, and an output that provides the calculated turnaround threshold.

The turnaround calculator of the preceding paragraph can optionally include, additionally and/or alternatively, any one or more of the following features, configurations and/or additional components.

The module includes a lookup table or implemented equation.

The output is provided to a display that displays an indication of the turnaround threshold.

The received brake heat sink mass is calculated based upon a received brake heat sink length from a brake wear measuring device.

The received brake heat sink length is determined based upon a distance an electric brake actuator must extend before it contacts a heat sink of an aircraft brake.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method comprising:
    measuring a brake temperature of an aircraft brake using a sensor;
    determining a brake heat sink mass of the aircraft brake using a wear measuring device; and
    calculating a turnaround threshold based upon the measured brake temperature and the determined brake heat sink mass.

2. The method of claim 1, further comprising calculating an estimated turnaround time based upon the measured brake temperature and the calculated turnaround threshold.

3. The method of claim 1, wherein calculating a turnaround threshold comprises inputting the determined brake heat sink mass and the measured brake temperature into a lookup table or equation, wherein the lookup table or equation provides an output of the calculated turnaround threshold.

4. The method of claim 3, wherein the lookup table or equation is implemented using digital logic.

5. The method of claim 1, further comprising indicating when the measured brake temperature is lower than the turnaround threshold using a display or annunciation.

6. The method of claim 1, wherein calculating a turnaround threshold is further based upon data received from an aircraft communications bus.

7. The method of claim 1, wherein determining a brake heat sink mass comprises:
    measuring a length of the brake heat sink using the wear measuring device; and
    calculating the brake heat sink mass based upon the measured length of the brake heat sink.

8. The method of claim 7, wherein measuring a length of the brake heat sink comprises:
    determining a distance an electric brake actuator extends before it contacts the brake heat sink of the aircraft brake; and
    determining the length of the brake heat sink based upon the determined distance the electric brake actuator extends before it contacts the brake heat sink.

9. A system comprising:
    a turnaround calculator that determines a turnaround threshold based upon a received brake temperature and a calculated brake heat sink mass; and
    a display that provides an output indicative of the determined turnaround threshold based upon an output of the turnaround calculator.

10. The system of claim 9, wherein the received brake temperature is received from at least one brake temperature sensor.

11. The system of claim 9, wherein the calculated received brake heat sink mass is calculated based upon known brake heat sink geometry and a received brake heat sink length from at least one wear measuring device.

12. The system of claim 11, wherein the received brake heat sink length is determined based upon a distance an electric brake actuator must extend before it contacts a heat sink of an aircraft brake.

13. The system of claim 9, wherein the turnaround calculator comprises a lookup table that is indexed using the received brake temperature and the received brake heat sink mass.

14. The system of claim 9, wherein the turnaround calculator comprises an electronically implemented equation.

15. The system of claim 9, wherein the determined turnaround threshold is further based upon data received from an aircraft communications bus.

16. A turnaround calculator comprising:
    an input that receives a measured aircraft brake temperature;
    an input that receives a determined aircraft brake heat sink mass, wherein the brake heat sink mass is calculated based upon a received brake heat sink length from a brake wear measuring device;

a circuit that determines a turnaround threshold based upon the measured brake temperature and the determined brake heat sink mass; and an output that provides the calculated turnaround threshold.

17. The turnaround calculator of claim 16, wherein the circuit includes a lookup table or implemented equation.

18. The turnaround calculator of claim 16, wherein the output is provided to a display that displays an indication of the turnaround threshold.

19. The turnaround calculator of claim 16, wherein the received brake heat sink length is determined based upon a distance an electric brake actuator must extend before it contacts a heat sink of an aircraft brake.

* * * * *